(12) United States Patent
Li et al.

(10) Patent No.: US 10,416,964 B2
(45) Date of Patent: Sep. 17, 2019

(54) ADDER DEVICE, DATA ACCUMULATION METHOD AND DATA PROCESSING DEVICE

(71) Applicant: Institute of Computing Technology, Chinese Academy of Sciences, Beijing (CN)

(72) Inventors: Zhen Li, Beijing (CN); Shaoli Liu, Beijing (CN); Shijin Zhang, Beijing (CN); Tao Luo, Beijing (CN); Cheng Qian, Beijing (CN); Yunji Chen, Beijing (CN); Tianshi Chen, Beijing (CN)

(73) Assignee: Institute of Computing Technology, Chinese Academy of Sciences, Beijing (CN)

( * ) Notice: Subject to any disclaimer, the term of this patent is extended or adjusted under 35 U.S.C. 154(b) by 0 days.

(21) Appl. No.: 15/773,974

(22) PCT Filed: Jun. 17, 2016

(86) PCT No.: PCT/CN2016/086110
§ 371 (c)(1),
(2) Date: May 4, 2018

(87) PCT Pub. No.: WO2017/092284
PCT Pub. Date: Jun. 8, 2017

(65) Prior Publication Data
US 2018/0321911 A1    Nov. 8, 2018

(30) Foreign Application Priority Data
Dec. 1, 2015 (CN) .......................... 2015 1 083726

(51) Int. Cl.
*G06F 7/509* (2006.01)
*G06F 7/50* (2006.01)
(Continued)

(52) U.S. Cl.
CPC ................. *G06F 7/50* (2013.01); *G06F 7/501* (2013.01); *G06F 7/509* (2013.01); *G06N 3/06* (2013.01);
(Continued)

(58) Field of Classification Search
CPC .................................... G06F 7/50; G06F 7/509
See application file for complete search history.

(56) References Cited

U.S. PATENT DOCUMENTS 3,515,344 A * 6/1970 Powers .................. G06F 7/509
                                                    708/626
5,276,773 A * 1/1994 Knauer .................. G06N 3/063
                                                    706/42
(Continued)

FOREIGN PATENT DOCUMENTS

CN        103279322 A    9/2013
CN        103970503 A    8/2014
(Continued)

OTHER PUBLICATIONS

International Search Report dated Sep. 20, 2016 in related PCT Application No. PCT/CN2016/086110.

*Primary Examiner* — Chuong D Ngo
(74) *Attorney, Agent, or Firm* — Maschoff Brennan

(57) ABSTRACT

The present disclosure discloses an adder device, a data accumulation method and a data processing device. The adder device comprises: a first adder module provided with an adder tree unit, composed of a multi-stage adder array, and a first control unit, wherein the adder tree unit accumulates data by means of step-by-step accumulation based on a control signal of the first control unit; a second adder module comprising a two-input addition/subtraction operation unit and a second control unit, and used for performing an addition or subtraction operation on input data; a shift operation module for performing a left shift operation on
(Continued)

output data of the first adder module; an AND operation module for performing an AND operation on output data of the shift operation module and output data of the second adder module; and a controller module.

24 Claims, 5 Drawing Sheets

(51) Int. Cl.
    *G06N 3/06*       (2006.01)
    *G06F 7/501*     (2006.01)
    *G06N 3/08*       (2006.01)

(52) U.S. Cl.
    CPC ........ *G06F 2207/4824* (2013.01); *G06N 3/08* (2013.01)

(56) References Cited

U.S. PATENT DOCUMENTS

| | | | | |
|---|---|---|---|---|
| 5,542,026 A | * | 7/1996 | Pechanek | ............... G06N 3/10 706/41 |
| 2011/0029471 A1 | | 2/2011 | Chakradhar et al. | |

FOREIGN PATENT DOCUMENTS

| | | |
|---|---|---|
| CN | 104090737 A | 10/2014 |
| CN | 105512724 A | 4/2016 |

\* cited by examiner

ADDER DEVICE, DATA ACCUMULATION METHOD AND DATA PROCESSING DEVICE

TECHNICAL FIELD

The present disclosure belongs to the data processing system field, relates to data processing of an adder device, and particularly relates to an adder device, a data accumulation method and a data processing device comprising the adder device.

BACKGROUND

Recently, the neural network algorithm based on a M-P neuron model is widely applied to the fields of product recommendation, image recognition, etc. The M-P neuron model is an additive neuron model, and an output value of a neuron equals to a result of nonlinear transformation of an accumulation of a bias value to the weighted sum of the inputs to a neuron, i.e., the neural network algorithm requires large number of accumulation operations and addition operations. Meanwhile, in a training process of the neural network algorithm, not only large number of accumulation operations but also subtraction operations are included.

When the traditional general processor is used to operate the neural network algorithm, or train one neural network, only two pieces of data can be added each time, so this method is low in efficiency. Moreover, when fixed-point data are used during the operation, the add overflow is also required to be processed.

SUMMARY

An object of the present disclosure is to solve deficiencies existing when the traditional processor runs the neural network algorithm, or train the neural network, and provide an adder device, a data accumulation method and a data processing device comprising the adder device, which can quickly accumulate, and perform an addition or subtraction operation on a batch of data vectors, such that the programmer can quickly perform an accumulation operation and an addition or subtraction operation in the neural network algorithm, and can achieve add overflow judging and overflow processing simultaneously in the same clock cycle, thereby improving a correct ratio of a prediction result of the neural network algorithm, without decreasing an execution speed of the neural network algorithm.

The present disclosure provides an adder device for quickly accumulating an input data stream, comprising:

a first adder module comprising at least one adder tree unit composed of a multi-stage adder array, and a first control unit, every stage of the multi-stage adder array comprising an adder group composed of a plurality of adders, and each of the adder group accumulating input data to form a group of partial sum data as input data of the next-stage adder array, wherein the adder tree unit accumulates input data of every stage by means of step-by-step accumulation to an accumulation sum data as output data of the first adder module based on a control signal of the first control unit;

a second adder module comprising a two-input addition/subtraction operation unit and a second control unit, the two-input addition/subtraction operation unit selectively performing an addition or subtraction operation on input data based on a control signal of the second control unit, and using an addition or subtraction operation result as output data of the second adder module;

a shift operation module connected to the first adder module, for performing a left shift operation on the output data of the first adder module, such that the output data of the first adder module has the same bit width as the output data of the second adder module, and using a shifted result as output data of the shift operation module;

an AND operation module connected to the shift operation module and the second adder module, for performing an AND operation on the output data of the shift operation module and the output data of the second adder module, and using an AND operation result as output data of the adder device; and a controller module for controlling data input of the first adder module and the second adder module, controlling a shift operation of the shift operation module, and controlling transmission of control signals of the first control unit and the second control unit.

As regards to the adder device of the present disclosure, in the adder tree unit, a register is provided at an output of an adder array in an intermediate stage of the multi-stage adder array for buffering the output data from the output of the adder array in the intermediate stage.

As regards to the adder device of the present disclosure, the first adder module is further provided with a plurality of registers for registering the partial sum data calculated by the adder group, based on the control signal of the first control unit, in which register the partial sum data is registered is determined, and the partial sum in which register among the plurality of registers is added to the accumulation sum data of the adder tree unit as the output data of the first adder module is determined.

As regards to the adder device of the present disclosure, it further comprises an overflow detection and overflow processing circuit for detecting whether an accumulated result of fixed-point numbers has an upward overflow or a downward overflow, if the upward overflow occurs, an operation result is set to the maximum positive number that can be expressed in a fixed-point number format, and if the downward overflow occurs, the operation result is set to the minimum negative number that can be expressed in the fixed-point number format;

wherein the upward overflow refers to that when an addition operation is performed on a plurality of fixed-point positive numbers, the operation result exceeds a positive number expression range of the fixed-point number format; and the downward overflow refers to that when an addition operation is performed on a plurality of fixed-point negative numbers, the operation result exceeds a negative number expression range of the fixed-point number format.

As regards to the adder device of the present disclosure, the controller module further comprises:

an operation code control unit for controlling data input of the first adder module and the second adder module;

a device ID control unit for determining a shift value of the shift operation module;

an accumulation source operand ID control unit for determining to select one from the plurality of partial sum registers to be added to an output result of the adder tree;

an enable signal control unit for validating the adder device at present;

a flag signal control unit for using the output data of the first adder module as the output data of the adder device.

In addition, the present disclosure further provides a method of quickly accumulating an output data stream using the above adder device, comprising:

step 1, in which a controller module transmits control signals to a first adder module and a second adder module, to determine values of input data of the first adder module and the second adder module, control a shift operation of a shift operation module, and control transmission of control signals of a first control unit and a second control unit;

step 2, in which after the first adder module and the second adder module receive the control signals from the controller module, respectively, based on the control signal, an adder tree unit of the first adder module accumulates input data of every stage by means of step-by-step accumulation to an accumulation sum data as output data of the first adder module, wherein the first adder module is composed of a multi-stage adder array; the second adder module selectively performs an addition or subtraction operation on the input data, and uses an addition or subtraction operation result as the output data of the second adder module;

step 3, in which a shift operation module performs a left shift operation on the output data of the first adder module based on the control signal, such that the output data of the first adder module has the same bit width as the output data of the second adder module, and uses a shifted result as output data of the shift operation module; and step 4, in which an AND operation module performs an AND operation on the output data of the shift operation module and the output data of the second adder module, and uses an AND operation result as output data of the adder device.

As regards to the accumulation method of the present disclosure, the step 2 further comprises, in the adder tree unit, a step of buffering output data from an output of an adder array in an intermediate stage using a register provided at the output of the adder array in the intermediate stage of the multi-stage adder array.

As regards to the accumulation method of the present disclosure, the step 2 further comprises determining, with respect to the registers for registering the partial sum data in the first adder module, in which register the partial sum data is registered, and determining the partial sum data in which register among the plurality of registers is added to the accumulation sum data of the adder tree unit as the output data of the first adder module, based on the control signal of the first control unit.

As regards to the accumulation method of the present disclosure, it further comprises detecting, using an overflow detection and overflow processing circuit, whether an accumulated result of fixed-point numbers has an upward overflow or a downward overflow, if the upward overflow occurs, the operation result is set to the maximum positive number that can be expressed in a fixed-point number format, and if the downward overflow occurs, the operation result is set to the minimum negative number that can be expressed in the fixed-point number format; wherein the upward overflow refers to that when an addition operation is performed on a plurality of fixed-point positive numbers, the operation result exceeds a positive number expression range of the fixed-point number format; and the downward overflow refers to that when an addition operation is performed on a plurality of fixed-point negative numbers, the operation result exceeds a negative number expression range of the fixed-point number format.

In addition, the present disclosure further provides a data processing device comprising the above adder device.

DETAILED DESCRIPTION

In order to make the object, the technical solution and advantages of the present disclosure much clearer, an adder device, a data accumulation method and a data processing device comprising the adder device of the present disclosure are further explained in detail below with reference to the drawings. It shall be understood that the specific embodiments described here are to explain the present disclosure only, and not to limit the present disclosure.

Figure 1:
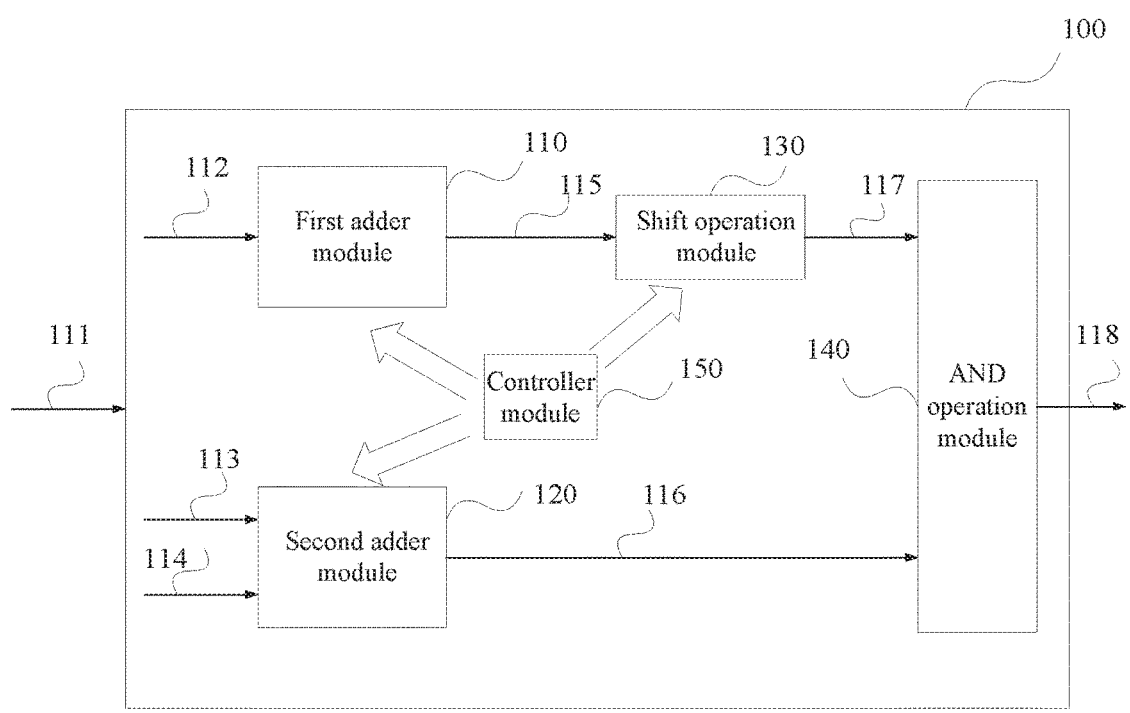
FIG. 1 illustrates schematically a structure diagram of an adder device of the present disclosure.

As shown in FIG. 1, an adder device 100 of the present disclosure, which supports an addition/subtraction operation of fixed-point data with different accuracies, comprises a first adder module 110, a second adder module 120, a shift operation module 130, an AND operation module 140 and a controller module 150. The first adder module 110 comprises an adder tree unit composed of a multi-stage adder array and a first control unit. Each stage of the adder array comprises an adder group composed of a plurality of adders, and the adder group accumulates input data to output a group of partial sum data as input data of the next-stage adder array. Based on a control signal from the first control unit, the adder tree unit accumulates input data of every stage by means of step-by-step accumulation to obtain an accumulation sum data as the output data 115 of the first adder module 110. The second adder module 120 comprises a two-input addition/subtraction operation unit and a second control unit, the two-input addition/subtraction operation unit selectively performing an addition or subtraction operation on the input data 113, 114 based on a control signal of the second control unit, and using an addition or subtraction operation result as output data 116 of the second adder module. The shift operation module 130 is connected to the first adder module, performs a left shift operation on the output data 115 of the first adder module, such that the output data of the first adder module has the same bit width as the output data of the second adder module, and outputs the shifted result as output data 117 of the shift operation module. The AND operation module 140 is connected to the shift operation module and the second adder module, performs an AND operation on the output data 117 of the shift operation module and the output data 116 of the second adder module, and outputs the AND operation result as output data 118 of the adder device. The controller module 150 controls data input 112, 113 and 114 to the first adder module and the second adder module, that is, assigns an input data stream selectively as the data input 112 to the first adder module 110 and the data inputs 113 and 114 to the second adder module 120 to be input to the first adder module 110 and the second adder module 120 respectively, controls the shift operation of the shift operation module, and controls output of control signals of the first control unit and the second control unit.

Figure 2:
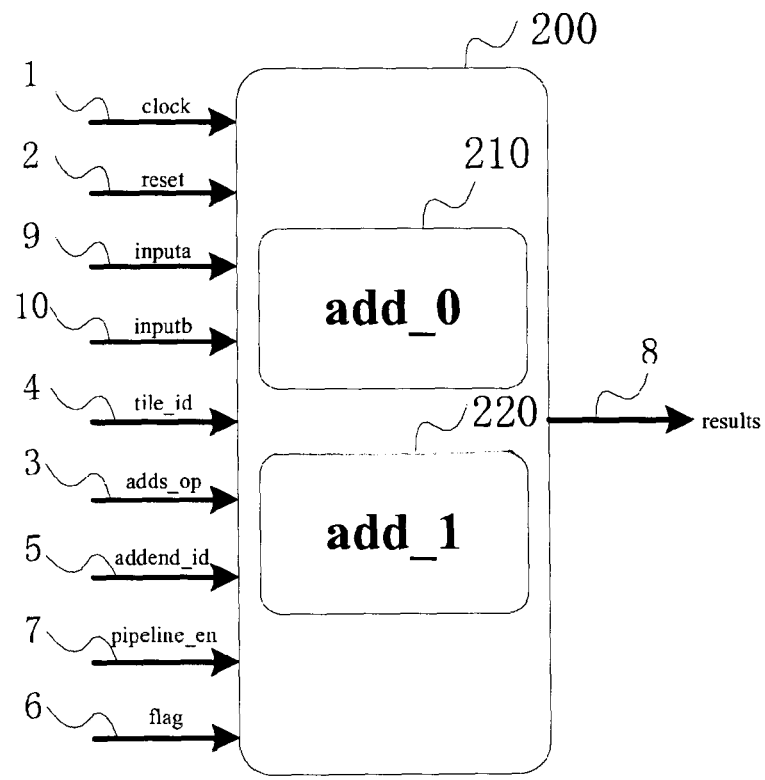
FIG. 2 illustrates a structure diagram of an adder device of an embodiment of the present disclosure.

FIG. 2 illustrates a structure diagram of the adder device 200 according to an embodiment of the present disclosure. The adder device 200 has a plurality of inputs and one output. The adder device is composed of a submodule adds_0 (corresponding to a first adder module) in FIG. 3 and a submodule adds_1 (corresponding to a second adder module) in FIG. 4, which coordinate with each other to complete an addition operation on the input data. Primary input and output interfaces of the adder device are a clock signal input port 1 (clock), a reset signal input port 2 (reset), primary data input ports 9 (inputa) and 10 (inputb), and a primary data output port 8 (results), and control signal ports mainly include an operation code port 3 (adds_op), a device ID port 4 (tile_id), an accumulation source operand ID port 5 (addend_id), a flag bit port 6 (flag), and an enable signal port 7 (pipeline_en). The control signal ports mainly control processing of a plurality of groups of input data, and output the corresponding processed result, and these control signals are output from the controller module. The data input ports 9 (inputa) and 10 (inputb) are consisted of a plurality of multibit data, and the multibit output data 8 (results) is obtained. In the data input ports 9 (inputa) and 10 (inputb), Input data 9 (inputa) is a vectorized input data and input data 10 (inputb) is vectorized input data which is set as being input from outside according to an operation code or vectorized data of a previous cycle registered in the previous cycle. The control signal 3 (adds_op) of the adder device functions to select a data input source of vectorized partial sum values 13 (partial_sum), 19 (inputa_1) and 20 (inputb_1), the control signal (tile_id) functions to determine a shift value of an output result 14 (results_0) of the module 210 (adds_0) so as to be processed in coordinate with other devices, the control signal 5 (addend_id) functions to select one from a plurality of partial sum registers to add to the output result of the adder tree, the control signal 6 (flag) functions to use the output result (result_0) of the module 210 (adds_0) as the result 8 (result) of all adds modules (i.e., an adder device 220), and the control signal 7 (pipeline_en) functions to validate the all adds modules at present.

Moreover, it shall be noted that the adder trees of multiple stages in the adder device of the present disclosure are composed of the same adder matrix, and each adder matrix is a full adder. Inputs of the adder matrix are two groups of multibit width input data, and the output is a group of multibit width data. Further, an adder chip of the present disclosure can be improved based on any of common adder chips, such as, common 74, 74HC, 74LS series adder chips in the market.

Figure 3:
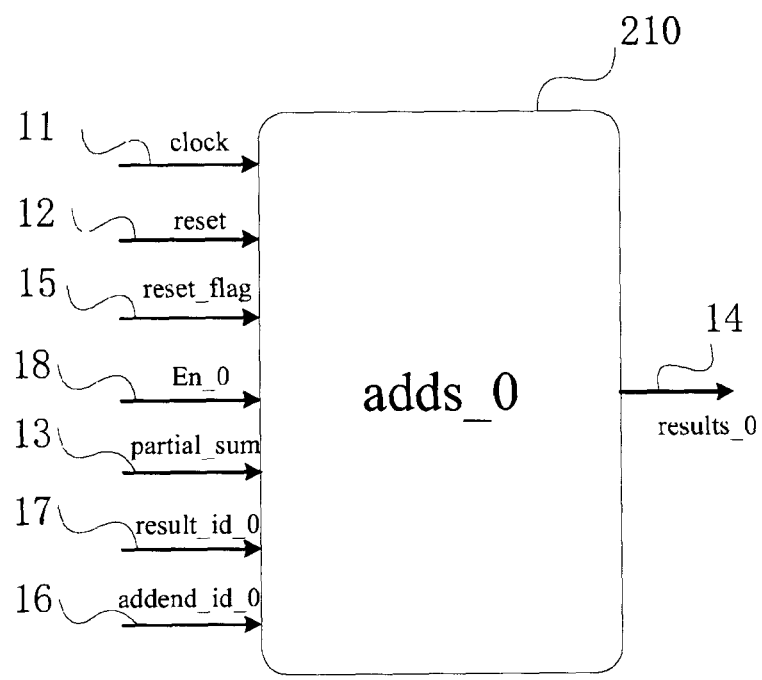
FIG. 3 illustrates a structure diagram of a first adder module of an embodiment of the present disclosure.

FIG. 3 illustrates a structure diagram of a first adder module according to an embodiment of the present disclosure. The submodule adds_0 (corresponding to the first adder module) has a plurality of inputs and one output, input interfaces are mainly a clock signal input port 11 (clock), a reset signal input port 12 (reset), and control signal ports, wherein the control signal ports include an input data port 13 (partial_sum), an output data port 14 (results_0), a control signal port 15 (reset_flag), an accumulated ID port 16 (addend_id_0), an accumulated result ID port 17 (result_id_0), and an enable signal port 18 (en_0), and these control signals come from the first control unit; wherein the input data 13 (partial_sum) is consisted of a plurality of multibit data, represents partial sum of the plurality of multibit width data, and comes from the adder input signal 9 (inputa). 15 (reset_flag), 18 (en_0), 16 (addend_id_0) and 17 (result_id_0) are control signals for the submodule (adds_0), wherein 18 (en_0) is an enable signal, 16 (addend_id_0) is used for selecting register indexes accumulated by the adder tree result, and 17 (result_id_0) is a result register index.

Figure 5:
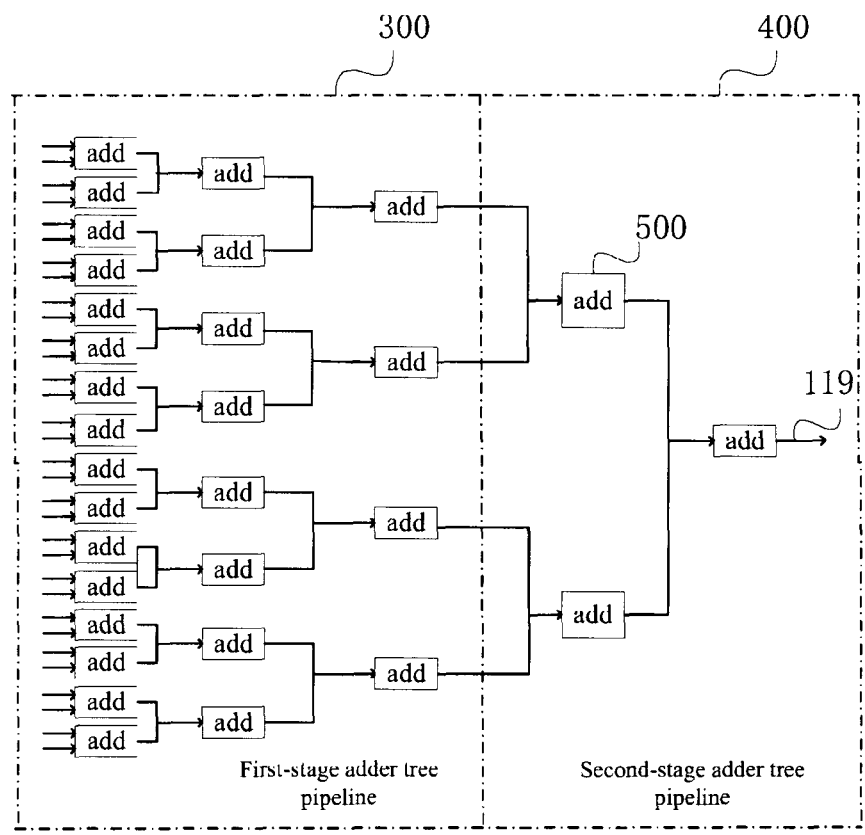
FIG. 5 illustrates a structure diagram of an adder tree unit of an embodiment of the present disclosure.

The main structure of the first adder module is an adder tree composed of multi-stage adders 500. As shown in FIG. 5, each of the adder arrays in every stage adds two groups of input partial sum data to form a group of partial sum data, and the adder tree finally accumulates the input data (partial_sum) including a plurality of partial sums as an accumulation sum data by means of step-by-step accumulation to output. As for the structure of the adder tree, now it is explained with a five-stage adder matrix. For example, the first-stage adder tree may be composed of 16 adder arrays, can perform an addition operation on 32 pieces of multibit width input data, and outputs 16 pieces of multibit width data. The second-stage adder tree is composed of 8 adder arrays, performs an addition operation on the 16 pieces of multibit width data from the first-stage adder tree, and outputs 8 pieces of multibit width data. The third-stage adder tree is composed of 4 adder arrays, performs an addition operation on the 8 pieces of multibit width data from the second-stage adder tree, outputs 4 pieces of multibit width data, and buffers the 4 pieces of multibit width data in a register (reg). The fourth-stage adder tree is composed of 2 adder arrays, performs an addition operation on the plurality of multibit width data in the register (reg), and outputs the plurality of multibit width data. The fifth-stage adder tree is composed of 1 adder array, performs an addition operation on two pieces of multibit width data of the fourth-stage adder tree, and outputs one piece of multibit width data. In addition, a register (reg) is provided in a certain stage adder tree for buffering the output data, and multiple stage pipelines are cut at this stage to decrease a path delay of the adder tree. The problems of low operation frequency and small operation throughput in the prior art can be better solved using the above solution. The first adder module is provided with a plurality of registers for registering a partial sum result. As stated above, 18 (en_0) is an enable signal, the operation result (result_0) is determined to be registered in which register according to the enable signal 18 (en_0) and the control signal 17 (result_id_0), and when 18 (en_0) is invalid, the operation result cannot be registered. The control signals 15 (reset_flag) and 16 (addend_id_0) are used for determining to add the partial sum in one register selected from the plurality of registers to the result of the adder tree as the result of the module (adds_0) to output.

Figure 4:
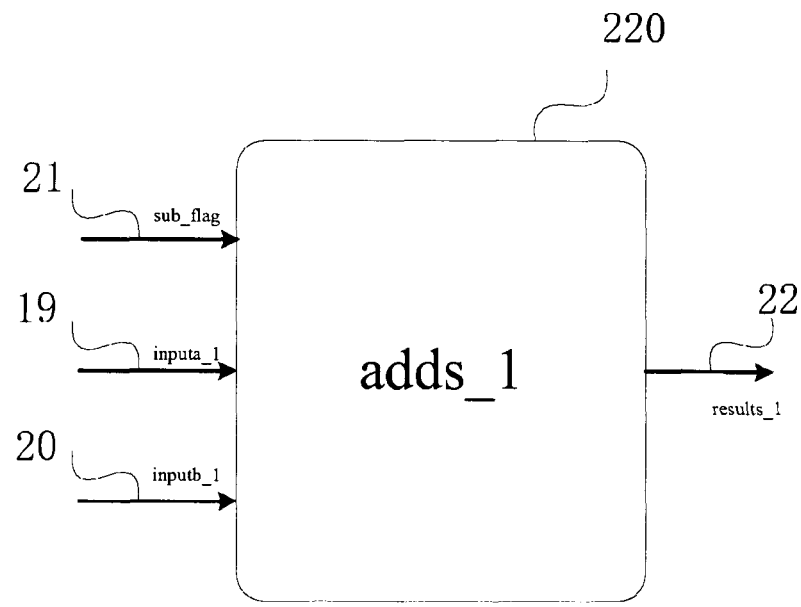
FIG. 4 illustrates a structure diagram of a second adder module of an embodiment of the present disclosure.

As shown in FIG. 4, the second adder module mainly has two groups of vectorized data inputs and one vectorized data output, and the main signals are multibit width input data 19 (inputa_1), 20 (inputb_1), a control signal 21 (sub_flag), and multibit width output data 22 (results_1). The control signal 21 (sub_flag), output from the second control unit, is used for controlling to perform which operation on the input data, i.e., to perform vectorized addition or subtraction on 19 (inputa_1) and 20 (inputb_1) based on the control signal 21 (sub_flag). For example, if the control signal 21 (sub_flag) is valid (e.g., the value is 1), the module output 20 (inputb_1) is subtracted from the module input 19 (inputa_1) as the output result 22 (results_1) of the submodule (adds_1). On the contrary, the module input 19 (inputa_1) is added to the module output 20 (inputb_1) as the output result 22 (results_1) of the submodule (adds_1).

The specific implementation of the adder device is described as follows.

Under coordination of the control signals including the clock signal 1 (clock), and the reset signals 2 (reset), 3 (adds_op), 4 (tile_id), 5 (addend_id), 6 (flag), 7 (pipeline_en), the adder device performs the following operation: determining, by the control signal 3 (adds_op), value of the input signals from the submodules adds_0 and adds 1.

As for a control process of the first adder module (adds_0), when the control signal 3 (adds_op) is 1 or 2, a value of the signal 13 (partial_sum) is obtained from the signal 9 (adds_inputa), and 13 (partial_sum) is 0 in other conditions. When the signal 3 (adds_op) is 2, the signal 6 (flag) is 1, and the signal 6 (flag) is 0 in other conditions. When the signal 3 (adds_op) is 1 or 2, and the signal 7 (pipeline_en) is valid, the signal 18 (en_0) is 1, otherwise, the signal 18 (en_0) is 0.

As for the control process of the first adder module (adds_0), the first adder module (adds_0) is mainly composed of multiple stage adder trees. Considering delay due to long path of the adder tree and the requirement for working frequency of the adder, the previous multiple stage adder trees are formed as a first-stage pipeline, the multibit width data calculated by the adder tree is buffered, and the buffered result is registered in a register of multibit width. The next-stage pipeline is composed of the subsequent multiple adder arrays of the adder tree, and the data in the register of multibit width are continued to be processed to finally obtain an data output of multibit width.

As for the control process of the first adder module (adds_0), a plurality of multibit width registers are provided inside the module. Now explanation is made taking three registers reg0, reg1 and reg2 as an example, and the three registers are mainly used for buffering the partial sum result. As for buffering of the partial sum, operations are performed as follows. When the input signal 18 (en_0) is valid, and 17 (result_id_0) is 0, the partial sum is assigned to reg0. When the input signal 18 (en_0) is valid, and 17 (result_id_0) is 1, the partial sum is assigned to reg1. When the input signal 18 (en_0) is valid, and 17 (result_id_0) is 2, the partial sum is assigned to reg2. With respect to the output, the module adds_0, based on the signal 16 (addend_id_0), determines to add the partial sum in one register selected from the three multibit width data registers to the multibit width output result of the adder tree. If the signal 15 (reset_flag) is invalid, it is not allowed to to add the partial sum in any one of the three multibit width registers to the multibit width data output from the adder tree.

As for the control process of the second adder module (adds_1), when the control signal (adds_op) is 3, or 4, or 5, or 6, a value of the signal 19 (inputa_1) is obtained from the signal 9 (inputa), and the signal 19 (inputa_1) is 0 in other conditions. When the signal 3 (adds_op) is 3, or 4, or 6, the signal 20 (inputb_1) is from the signal 10 (inputb), and the signal 20 (inputb_1) is 0 in other conditions.

Based on the input data and the control signal, multibit width output data 14 (result_0) is obtained by the adder submodule adds_0. Multibit width data 22 (results_1) is output by the submodule adds_1. After a left shift operation is performed on the multibit width data 14 (result_0) of the submodule adds_0 to make it have the same bit width as the output data of the submodule (adds_1), an AND operation is performed on the multibit width data 14 (result_0) of the submodule adds_0 and the multibit width output data 22 (results_1) of the submodule (adds_1) to finally obtain multibit width output data 8 (results).

In addition, the adder device of the present disclosure further comprises an overflow detection and overflow processing circuit for detecting whether an accumulated result of fixed-point numbers has an upward overflow or a downward overflow. If the upward overflow occurs, the operation result is set to the maximum positive number that can be expressed in a fixed-point number format, and if the downward overflow occurs, the operation result is set to the minimum negative number that can be expressed in the fixed-point number format; wherein the upward overflow refers to that a result of adding two fixed-point positive numbers (sign bits are "0") exceeds a positive number expression range of the fixed-point number format, so carrying of the sign bits occurs, and the sign bits of result fixed-point numbers are changed to "1"; the downward overflow refers to that a result of adding two fixed-point negative numbers (sign bits are "1") exceeds a negative number expression range of the fixed-point number format, so reversal of the sign bits occurs, and the sign bits of result fixed-point numbers are changed to "0". Training of the neural network algorithm can be faster, and better prediction result is obtained by using this overflow processing mode.

Figure 6:
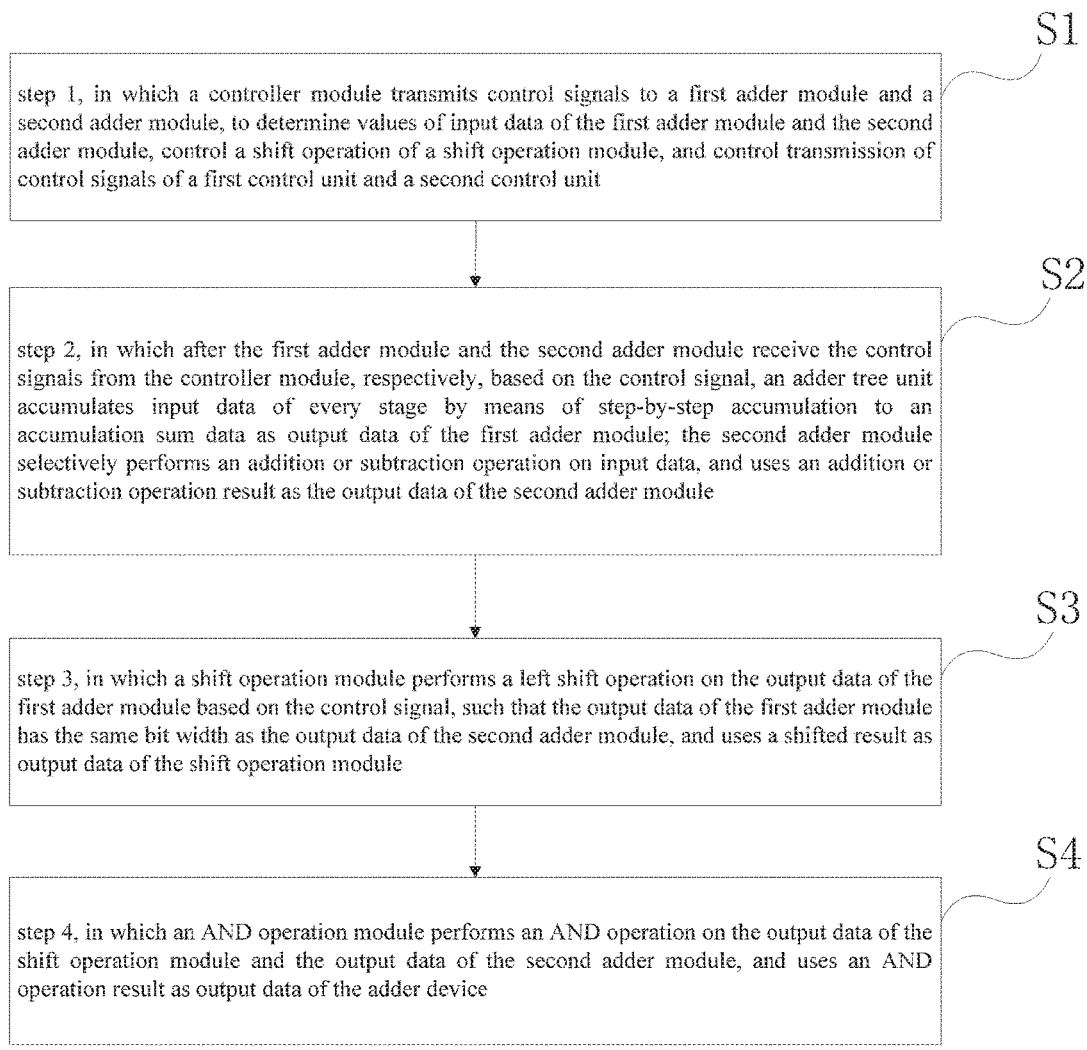
FIG. 6 illustrates a flow chart of an accumulation method of the present disclosure.

In addition, the present disclosure further provides a method of quickly accumulating an output data stream using the above adder device, a flow chart of the method is shown in FIG. 6, and comprises the following steps:

step 1, in which a controller module transmits control signals to a first adder module and a second adder module, determines values of input data of the first adder module and the second adder module, controls a shift operation of a shift operation module, and controls transmission of control signals for a first control unit and a second control unit;

step 2, in which after the first adder module and the second adder module receive the control signals from the controller module, respectively, an adder tree unit of the first adder module accumulates input data of every stage by means of step-by-step accumulation to an accumulation sum data as output data of the first adder module based on the control signal, wherein the first adder module is composed of a multi-stage adder array; the second adder module selectively performs an addition or subtraction operation on the input data, and uses an addition or subtraction operation result as output data of the second adder module;

step 3, in which a shift operation module performs a left shift operation on the output data of the first adder module based on the control signal, such that the output data of the first adder module has the same bit width as the output data of the second adder module, and uses a shifted result as output data of the shift operation module; and step 4, in which an AND operation module performs an AND operation on the output data of the shift operation module and the output data of the second adder module, and uses an AND operation result as output data of the adder device.

As regards to the accumulation method of the present disclosure, the step 2 further comprises:

in the adder tree unit, a step of buffering output data from an output of an adder array in an intermediate stage using a register provided at the output of the adder array in the intermediate stage of the multi-stage adder array.

As regards to the accumulation method of the present disclosure, the step 2 further comprises:

determining, with respect to the registers for registering the partial sum data in the first adder module, in which register the partial sum data is registered, and determining the partial sum data in which register among the plurality of registers is added to the accumulation sum data of the adder tree unit as the output data of the first adder module based on the control signal of the first control unit.

As regards to the accumulation method of the present disclosure, it further comprises:

detecting, using an overflow detection and overflow processing circuit, whether an accumulated result of fixed-point numbers has an upward overflow or a downward overflow, if the upward overflow occurs, the operation result is set to the maximum positive number that can be expressed in a fixed-point number format, and if the downward overflow occurs, the operation result is set to the minimum negative number that can be expressed in the fixed-point number format;

wherein the upward overflow refers to that when an addition operation is performed on a plurality of fixed-point positive numbers, the operation result exceeds a positive number expression range of the fixed-point number format;

the downward overflow refers to that when an addition operation is performed on a plurality of fixed-point negative numbers, the operation result exceeds a negative number expression range of the fixed-point number format.

Figure 7:
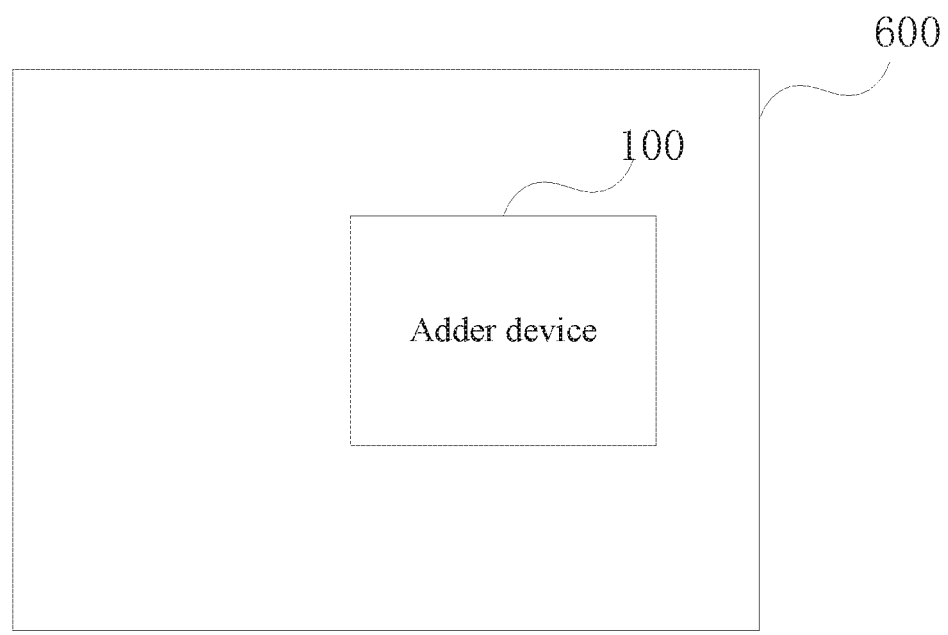
FIG. 7 illustrates a structure diagram of a data processing device of an embodiment of the present disclosure.

In addition, as shown in FIG. 7, the present disclosure further provides a data processing device 600 comprising the adder device 100. The data processing device 600 may be, such as, a signal processor, a signal processing chip, and a graphics processing unit, and applied to the fields of image processing, multimedia playing, network transaction processing, and pattern recognition, etc.

The device and method may quickly achieve an accumulation operation and an addition/subtraction operation in the neural network algorithm; supports an addition/subtraction operation of fixed-point data with different accuracies, and improves an accuracy of the operation result; can achieve add overflow judging and overflow processing simultaneously in the same clock cycle, thereby not affecting an executing speed of the neural network algorithm, while improving a correct ratio of a prediction result of the neural network algorithm.

The invention claimed is:

1. An adder device for quickly accumulating an input data stream, comprising:
    a first adder module comprising at least one adder tree unit composed of a multi-stage adder array, and a first control unit, every stage of the multi-stage adder array comprising an adder group composed of a plurality of adders, and each of the adder group accumulating input data to form a group of partial sum data as input data of the next-stage adder array, wherein the adder tree unit accumulates input data of every stage by means of step-by-step accumulation to an accumulation sum data as output data of the first adder module based on a control signal of the first control unit;
    a second adder module comprising a two-input addition/subtraction operation unit and a second control unit, the two-input addition/subtraction operation unit selectively performing an addition or subtraction operation on input data based on a control signal of the second control unit, and using an addition or subtraction operation result as output data of the second adder module;
    a shift operation module connected to the first adder module, for performing a left shift operation on the output data of the first adder module, such that the output data of the first adder module has the same bit width as the output data of the second adder module, and using a shifted result as output data of the shift operation module;
    an AND operation module connected to the shift operation module and the second adder module, for performing an AND operation on the output data of the shift operation module and the output data of the second adder module, and using an AND operation result as output data of the adder device; and
    a controller module for controlling data input of the first adder module and the second adder module, controlling a shift operation of the shift operation module, and controlling transmission of control signals of the first control unit and the second control unit.

2. The adder device according to claim 1, wherein,
    in the adder tree unit, a register is provided at an output of an adder array in an intermediate stage of the multi-stage adder array for buffering the output data from the output of the adder array in the intermediate stage.

3. The adder device according to claim 2, further comprising:
    an overflow detection and overflow processing circuit for detecting whether an accumulated result of fixed-point numbers has an upward overflow or a downward overflow, if the upward overflow occurs, the operation result is set to the maximum positive number that can be expressed in a fixed-point number format, and if the downward overflow occurs, the operation result is set to the minimum negative number that can be expressed in the fixed-point number format.

4. The adder device according to claim 2, wherein the controller module further comprises:
    an operation code control unit for controlling data input of the first adder module and the second adder module;
    a device ID control unit for determining a shift value of the shift operation module;
    an accumulation source operand ID control unit for determining to select one from the plurality of partial sum registers to be added to an output result of the adder tree;
    an enable signal control unit for validating the adder device at present; and
    a flag signal control unit for using the output data of the first adder module as the output data of the adder device.

5. The adder device according to claim 1, wherein,
    the first adder module is further provided with a plurality of registers for registering the partial sum data calculated by the adder group, based on the control signal of the first control unit, in which register the partial sum data is registered is determined, and the partial sum in which register among the plurality of registers is added to the accumulation sum data of the adder tree unit as the output data of the first adder module is determined.

6. The adder device according to claim 5, further comprising:
    an overflow detection and overflow processing circuit for detecting whether an accumulated result of fixed-point numbers has an upward overflow or a downward overflow, if the upward overflow occurs, the operation result is set to the maximum positive number that can be expressed in a fixed-point number format, and if the downward overflow occurs, the operation result is set to the minimum negative number that can be expressed in the fixed-point number format.

7. The adder device according to claim 5, wherein the controller module further comprising:
    an operation code control unit for controlling data input of the first adder module and the second adder module;
    a device ID control unit for determining a shift value of the shift operation module;
    an accumulation source operand ID control unit for determining to select one from the plurality of partial sum registers to be added to an output result of the adder tree;

an enable signal control unit for validating the adder device at present a flag signal control unit for using the output data of the first adder module as the output data of the adder device.

8. The adder device according to claim 1, further comprising:
an overflow detection and overflow processing circuit for detecting whether an accumulated result of fixed-point numbers has an upward overflow or a downward overflow, if the upward overflow occurs, the operation result is set to the maximum positive number that can be expressed in a fixed-point number format, and if the downward overflow occurs, the operation result is set to the minimum negative number that can be expressed in the fixed-point number format.

9. The adder device according to claim 1, wherein the controller module further comprises:
an operation code control unit for controlling data input of the first adder module and the second adder module;
a device ID control unit for determining a shift value of the shift operation module;
an accumulation source operand ID control unit for determining to select one from the plurality of partial sum registers to be added to an output result of the adder tree;
an enable signal control unit for validating the adder device at present; and
a flag signal control unit for using the output data of the first adder module as the output data of the adder device.

10. A method of quickly accumulating an output data stream using an adder device, wherein the adder device for quickly accumulating an input data stream comprises:
a first adder module comprising at least one adder tree unit composed of a multi-stage adder array, and a first control unit, every stage of the multi-stage adder array comprising an adder group composed of a plurality of adders, and each of the adder group accumulating input data to form a group of partial sum data as input data of the next-stage adder array, wherein the adder tree unit accumulates input data of every stage by means of step-by-step accumulation to an accumulation sum data as output data of the first adder module based on a control signal of the first control unit;
a second adder module comprising a two-input addition/subtraction operation unit and a second control unit, the two-input addition/subtraction operation unit selectively performing an addition or subtraction operation on input data based on a control signal of the second control unit, and using an addition or subtraction operation result as output data of the second adder module;
a shift operation module connected to the first adder module, for performing a left shift operation on the output data of the first adder module, such that the output data of the first adder module has the same bit width as the output data of the second adder module, and using a shifted result as output data of the shift operation module;
an AND operation module connected to the shift operation module and the second adder module, for performing an AND operation on the output data of the shift operation module and the output data of the second adder module, and using an AND operation result as output data of the adder device; and
a controller module for controlling data input of the first adder module and the second adder module, controlling a shift operation of the shift operation module, and controlling transmission of control signals of the first control unit and the second control unit,
the method comprising the following steps:
step 1, in which a controller module transmits control signals to a first adder module and a second adder module, to determine values of input data of the first adder module and the second adder module, control a shift operation of a shift operation module, and control transmission of control signals of a first control unit and a second control unit;
step 2, in which after the first adder module and the second adder module receive the control signals from the controller module, respectively, based on the control signal, an adder tree unit of the first adder module accumulates input data of every stage by means of step-by-step accumulation to an accumulation sum data as output data of the first adder module, wherein the first adder module is composed of a multi-stage adder array; the second adder module selectively performs an addition or subtraction operation on input data, and uses an addition or subtraction operation result as the output data of the second adder module;
step 3, in which a shift operation module performs a left shift operation on the output data of the first adder module based on the control signal, such that the output data of the first adder module has the same bit width as the output data of the second adder module, and uses a shifted result as output data of the shift operation module; and
step 4, in which an AND operation module performs an AND operation on the output data of the shift operation module and the output data of the second adder module, and uses an AND operation result as output data of the adder device.

11. The accumulation method according to claim 10, wherein the step 2 further comprises:
in the adder tree unit, a step of buffering output data from an output of the adder array in an intermediate stage using a register provided at the output of the adder array in the intermediate stage of the multi-stage adder array.

12. The accumulation method according to claim 11, further comprising:
detecting, using an overflow detection and overflow processing circuit, whether an accumulated result of fixed-point numbers has an upward overflow or a downward overflow, if the upward overflow occurs, the operation result is set to the maximum positive number that can be expressed in a fixed-point number format, and if the downward overflow occurs, the operation result is set to the minimum negative number that can be expressed in the fixed-point number format.

13. The accumulation method according to claim 10, wherein the step 2 further comprising:
determining, with respect to the registers for registering the partial sum data in the first adder module, in which register the partial sum data is registered, and determining the partial sum data in which register among the plurality of registers is added to the accumulation sum data of the adder tree unit as the output data of the first adder module, based on the control signal of the first control unit.

14. The accumulation method according to claim 13, further comprising:
detecting, using an overflow detection and overflow processing circuit, whether an accumulated result of fixed-point numbers has an upward overflow or a downward overflow, if the upward overflow occurs, the operation result is set to the maximum positive number that can be expressed in a fixed-point number format, and if the downward overflow occurs, the operation result is set to the minimum negative number that can be expressed in the fixed-point number format.

15. The accumulation method according to claim 10, further comprising:
detecting, using an overflow detection and overflow processing circuit, whether an accumulated result of fixed-point numbers has an upward overflow or a downward overflow, if the upward overflow occurs, the operation result is set to the maximum positive number that can be expressed in a fixed-point number format, and if the downward overflow occurs, the operation result is set to the minimum negative number that can be expressed in the fixed-point number format.

16. A data processing device comprising the adder device, wherein the adder device for quickly accumulating an input data stream comprises:
a first adder module comprising at least one adder tree unit composed of a multi-stage adder array, and a first control unit, every stage of the multi-stage adder array comprising an adder group composed of a plurality of adders, and each of the adder group accumulating input data to form a group of partial sum data as input data of the next-stage adder array, wherein the adder tree unit accumulates input data of every stage by means of step-by-step accumulation to an accumulation sum data as output data of the first adder module based on a control signal of the first control unit;
a second adder module comprising a two-input addition/subtraction operation unit and a second control unit, the two-input addition/subtraction operation unit selectively performing an addition or subtraction operation on input data based on a control signal of the second control unit, and using an addition or subtraction operation result as output data of the second adder module;
a shift operation module connected to the first adder module, for performing a left shift operation on the output data of the first adder module, such that the output data of the first adder module has the same bit width as the output data of the second adder module, and using a shifted result as output data of the shift operation module;
an AND operation module connected to the shift operation module and the second adder module, for performing an AND operation on the output data of the shift operation module and the output data of the second adder module, and using an AND operation result as output data of the adder device; and
a controller module for controlling data input of the first adder module and the second adder module, controlling a shift operation of the shift operation module, and controlling transmission of control signals of the first control unit and the second control unit.

17. The data processing device according to claim 16, wherein in the adder tree unit, a register is provided at an output of an adder array in an intermediate stage of the multi-stage adder array for buffering the output data from the output of the adder array in the intermediate stage.

18. The data processing device according to claim 17, wherein an overflow detection and overflow processing circuit for detecting whether an accumulated result of fixed-point numbers has an upward overflow or a downward overflow, if the upward overflow occurs, the operation result is set to the maximum positive number that can be expressed in a fixed-point number format, and if the downward overflow occurs, the operation result is set to the minimum negative number that can be expressed in the fixed-point number format.

19. The data processing device according to claim 17, wherein the controller module further comprises:
an operation code control unit for controlling data input of the first adder module and the second adder module;
a device ID control unit for determining a shift value of the shift operation module;
an accumulation source operand ID control unit for determining to select one from the plurality of partial sum registers to be added to an output result of the adder tree;
an enable signal control unit for validating the adder device at present; and
a flag signal control unit for using the output data of the first adder module as the output data of the adder device.

20. The data processing device according to claim 16, wherein the first adder module is further provided with a plurality of registers for registering the partial sum data calculated by the adder group, based on the control signal of the first control unit, in which register the partial sum data is registered is determined, and the partial sum in which register among the plurality of registers is added to the accumulation sum data of the adder tree unit as the output data of the first adder module is determined.

21. The data processing device according to claim 20, wherein an overflow detection and overflow processing circuit for detecting whether an accumulated result of fixed-point numbers has an upward overflow or a downward overflow, if the upward overflow occurs, the operation result is set to the maximum positive number that can be expressed in a fixed-point number format, and if the downward overflow occurs, the operation result is set to the minimum negative number that can be expressed in the fixed-point number format.

22. The data processing device according to claim 20, wherein the controller module further comprises:
an operation code control unit for controlling data input of the first adder module and the second adder module;
a device ID control unit for determining a shift value of the shift operation module;
an accumulation source operand ID control unit for determining to select one from the plurality of partial sum registers to be added to an output result of the adder tree;
an enable signal control unit for validating the adder device at present; and
a flag signal control unit for using the output data of the first adder module as the output data of the adder device.

23. The data processing device according to claim 16, wherein an overflow detection and overflow processing circuit for detecting whether an accumulated result of fixed-point numbers has an upward overflow or a downward overflow, if the upward overflow occurs, the operation result is set to the maximum positive number that can be expressed in a fixed-point number format, and if the downward overflow occurs, the operation result is set to the minimum negative number that can be expressed in the fixed-point number format.

24. The data processing device according to claim 16, wherein the controller module further comprises:
an operation code control unit for controlling data input of the first adder module and the second adder module;

a device ID control unit for determining a shift value of the shift operation module;

an accumulation source operand ID control unit for determining to select one from the plurality of partial sum registers to be added to an output result of the adder tree;

an enable signal control unit for validating the adder device at present; and a flag signal control unit for using the output data of the first adder module as the output data of the adder device.

\* \* \* \* \*